(No Model.) 2 Sheets—Sheet 1.

W. M. THOMAS.
SYSTEM OF WINDING ARMATURES FOR DYNAMO ELECTRIC MACHINES.

No. 494,042. Patented Mar. 21, 1893.

Witnesses:
Harry T. Rohrer
George E. Cruse

Inventor:
Wm. M. Thomas
By Knight Bros
Attorneys.

(No Model.) 2 Sheets—Sheet 2.

W. M. THOMAS.
SYSTEM OF WINDING ARMATURES FOR DYNAMO ELECTRIC MACHINES.

No. 494,042. Patented Mar. 21, 1893.

Witnesses:
Harry S. Rohrer
George E. Cruse

Inventor:
Wm M. Thomas
By Knight Bros.
Attorneys.

UNITED STATES PATENT OFFICE.

WILLIAM M. THOMAS, OF GRAND RAPIDS, ASSIGNOR TO LOUIS WARFIELD, OF DETROIT, MICHIGAN.

SYSTEM OF WINDING ARMATURES FOR DYNAMO-ELECTRIC MACHINES.

SPECIFICATION forming part of Letters Patent No. 494,042, dated March 21, 1893.

Application filed January 29, 1892. Serial No. 419,719. (No model.)

*To all whom it may concern:*

Be it known that I, WILLIAM M. THOMAS, a citizen of the United States, residing at Grand Rapids, in the county of Kent and State of Michigan, have invented new and useful Improvements in Systems of Winding Armatures for Dynamo-Electric Machines; and I declare the following to be a full, clear, and exact description of my invention.

My present application is a substitute for my application, Serial No. 213,923, filed September 18, 1886, the subject-matter remaining unchanged, and my invention consists of a novel system of winding an armature in a simple manner, which reduces the building or piling up of wire at the ends of armatures to a minimum. This wire at the ends of armatures not being active, it is desirable to reduce the amount as far as possible. My system of winding makes possible, the use of a small number of coils, also as many wires in each coil and as many convolutions as may be desired, without increasing the complication, as all wires in one coil are wound simultaneously side by side, like longitudinal threads in a ribbon. The type of armature I use and herein describe is the well known Siemens drum armature, and in this instance is divided circumferentially into eight divisions or boxes, in which I wind four coils of insulated copper wire in a manner hereinafter shown and described. A valuable feature of this system of winding is that the positive and negative ends of the wire form the outside layer of the coils, admitting of the use of any desired system, of connecting to the commutator. In my description I make use of what is known as the Gramme connection.

Having mentioned some of the novel features in my invention, I will now describe the several drawings which illustrate the successive steps of my system.

Similar letters and figures refer to similar parts in the several drawings.

Figure 1:
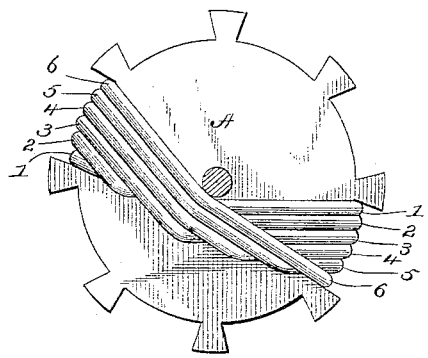
Figure 2:
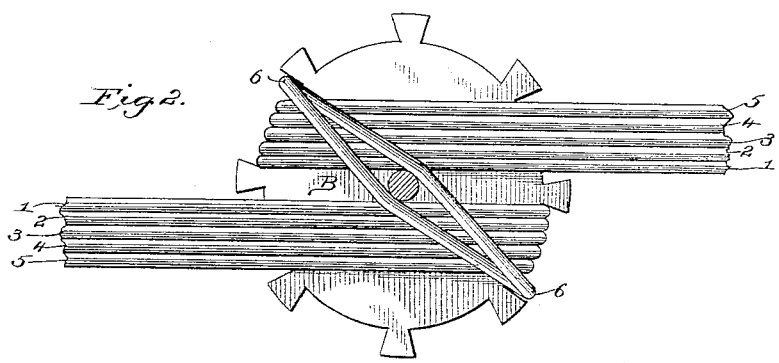
Figure 3:
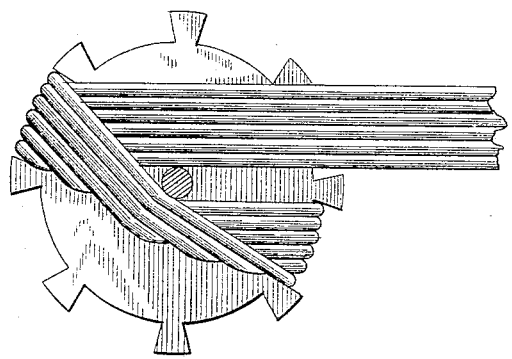
Figure 4:
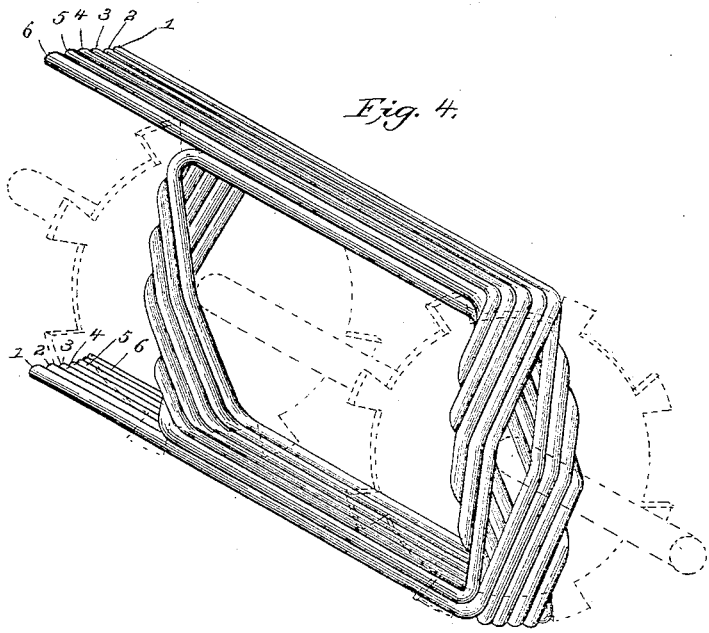
Figure 5:
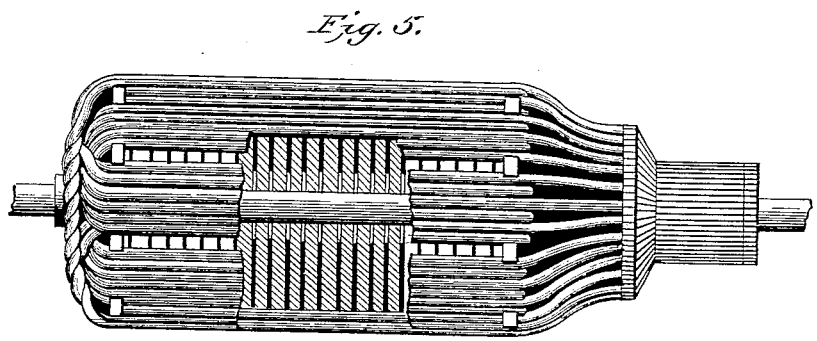

Figure 1 represents in elevation the front or commutator end of an armature, showing the first layer of the first coil in position, and also showing the flat twist whereby all wires of each layer are brought diametrically opposite each other. In the drawings I show as few wires as possible (namely six) in order to render my description as clear as may be. This number of wires will represent the longitudinal threads in my ribbon before mentioned and hereinafter the whole six will be designated simply as a ribbon. Fig. 2 represents the rear end of armature showing ends of ribbon passing by the shaft on either side, also the sixth wire of the ribbon crossed over to the diametrically opposite side of armature, and forming the first wire of the second layer of coil. Fig. 3 also represents the rear end of the armature showing the complete flat twist in the ribbon, and with one end of ribbon wound in its box thus completing the second layer. Fig. 4 represents in dotted lines a skeleton armature with one coil completely wound, showing the free connecting ends of the ribbon. Fig. 5 represents an armature completely wound and with a portion broken away showing the well known cylinder of soft iron disks on which the coils are wound.

I will now proceed to describe in detail the necessary steps in winding an armature after my system. Having decided on the number of wires to be wound in each coil, I cut them to the proper length required to form the number of convolutions wanted. They are then arranged side by side constituting what I term a ribbon. A novel feature is that I commence winding at the center of the length of my wires or ribbon, placing the center on the end of the armature marked A, Fig. 1. I proceed to wind these ends of my ribbon in opposite directions around the armature, until the desired number of convolutions is reached. I make a flat twist in my ribbon extending clear across the face or end of the armature every time I pass an end thereof for the purpose of bringing the wires diametrically opposite each other. The change in the position of the several wires composing a ribbon may be traced by following wires numbered 1, 2, 3, 4, 5, 6 in the several drawings. It will be seen by referring to Figs. 1, 2 and 3, that the entire number of wires composing a coil pass to the side of the armature shaft, thus avoiding splitting the coils which would increase the building up at ends, of armature two fold.

Referring now to Fig. 2, which represents the opposite end B, of my armature from that at which I begin my winding: It will be seen that the ends of the ribbon are first bent down and passed by the armature shaft. Then starting with the outside wire which is numbered 6, in my ribbon, it is completely wound in place. I show this action carried out with wire 6 for the purpose of illustrating the manipulation of all succeeding wires of the ribbon.

Fig. 3 represents a completed twist in ribbon, extending clear across the end of armature. I show one end of the ribbon wound completely and in place forming the second layer of the coil on one side of the armature. It is plain, that the wires which constitute the inside or first layer of coil on one side also form the outside layer on the opposite side of armature. The same holds true of the remaining end of ribbon when twisted into position.

Fig. 4, represents more fully the appearance of a coil complete with its free connecting ends ready to be joined to commutator. It will now be readily seen that my system of winding is very systematic, the resulting wound armature is neat and compact, and also that the addition of more coils of a greater number of wires to each coil does not complicate it to any extent.

I have shown the manner in which the first coil is wound. All that is necessary to complete the armature is to wind each succeeding coil at the proper angle to the coil just preceding until the four coils are in place. Each alternate wire at one end of the ribbon is connected to the commutator while each intermediate wire passes around and is connected with the opposite end of the next wire which is attached on the other side of the commutator, that is to say, the end of wire 1 is carried around and connected to the commutator with one end of wire 3 while the opposite end of wire 3 passes around and connects with one end of wire 5 and so on forming Siemens' connection. An armature thus completed is shown in Fig. 5.

Having described my invention, what I wish to claim and secure by Letters Patent is as follows:

1. The method of winding drum armatures for electric machines which consists in winding all wires constituting each coil simultaneously side by side like longitudinal threads in a ribbon, and filling the area of the divisions of the armature at each winding substantially as set forth.

2. The method of winding drum armatures for electric machines which consists in winding all wires constituting each coil simultaneously side by side, commencing at the middle of the length of all wires composing a ribbon, and winding the ends of the ribbon in opposite directions across one end of the armature then along the sides each alternate wire at the ends of the ribbon being connected to the commutator, while each intermediate wire is passed around and joined to the commutator with the next wire which is connected on the opposite side, substantially as described.

3. The method of winding drum armatures for electric machines, which consists in passing all wires in a convolution to one side of the armature shaft and then extending them across the end of the armature by means of a flat twist in the ribbon, substantially as set forth and described.

4. The method of winding drum armatures for electric machines which consists in winding the individual wires of one half of a convolution of the ribbon, on one side of the armature, diametrically opposite, the same wires in the other half of the convolution of ribbon and each ribbon filling the area of a division of the armature, thus permitting the use of any of the well known forms of connections to commutator as explained.

5. A drum armature whose winding consists of ribbons formed of a series of wires and wound from their middle in both directions along the sides of the armature, said ribbons crossing the ends and having thereat a flat twist so that parts of the individual wires lie diametrically opposite each other in the halves of the respective convolutions on opposite sides of the armature; whereby the building up of the ends of the armature is avoided and the armature adapted for different systems of commutator connection as explained.

WILLIAM M. THOMAS.

Witnesses:
   LOUIS WARFIELD,
   SUSIE BOGUE.